United States Patent
Gubo et al.

(10) Patent No.: US 9,202,179 B2
(45) Date of Patent: Dec. 1, 2015

(54) DEVICE TO DOCUMENT PROCESSES

(76) Inventors: Adalbert Gubo, Mainz (DE); Christina Schuette, Alsheim (DE)

( * ) Notice: Subject to any disclaimer, the term of this patent is extended or adjusted under 35 U.S.C. 154(b) by 0 days.

(21) Appl. No.: 14/004,184

(22) PCT Filed: Mar. 12, 2012

(86) PCT No.: PCT/EP2012/054305
§ 371 (c)(1),
(2), (4) Date: Apr. 21, 2014

(87) PCT Pub. No.: WO2012/120153
PCT Pub. Date: Sep. 13, 2012

(65) Prior Publication Data
US 2014/0224869 A1  Aug. 14, 2014

(30) Foreign Application Priority Data
Mar. 10, 2011 (EP) .................... 11157617

(51) Int. Cl.
| | |
|---|---|
| G06K 1/00 | (2006.01) |
| G06Q 10/00 | (2012.01) |
| G06K 1/12 | (2006.01) |
| B65C 9/46 | (2006.01) |
| H04L 9/32 | (2006.01) |
| G06Q 10/08 | (2012.01) |

(52) U.S. Cl.
CPC *G06Q 10/00* (2013.01); *B65C 9/46* (2013.01); *G06K 1/121* (2013.01); *G06Q 10/0833* (2013.01); *H04L 9/3239* (2013.01); *H04L 2209/805* (2013.01)

(58) Field of Classification Search
CPC .................... G06K 1/121; B65C 9/46
USPC ........................... 235/375, 376, 487
See application file for complete search history.

(56) References Cited

U.S. PATENT DOCUMENTS

| | | |
|---|---|---|
| 2005/0289083 A1 | 12/2005 | Ngai et al. |
| 2006/0174129 A1 | 8/2006 | Brignone et al. |
| 2009/0292925 A1 | 11/2009 | Meisel |
| 2011/0099117 A1* | 4/2011 | Schepers et al. ............ 705/318 |

FOREIGN PATENT DOCUMENTS

| | | |
|---|---|---|
| DE | 102007045692 A1 | 4/2009 |
| EP | 1701293 A1 | 9/2006 |
| EP | 2075738 A1 | 7/2009 |
| WO | WO-2010012059 A1 | 2/2010 |

OTHER PUBLICATIONS

International Search Report for PCT/EP2012/054305 mailed Jul. 18, 2012.

* cited by examiner

*Primary Examiner* — Christle I Marshall
(74) *Attorney, Agent, or Firm* — Drinker Biddle & Reath LLP (57) ABSTRACT

The invention relates to a multi-component device Z to document processes R comprising at least one step wherein a device Y collects information from all components Cij used to make the product Di of an individual process step i, a device X calculates a hash code for each component Cij, a device W calculates a hash code Ji from all hash codes components used in process step i, and a device T provides the product Di with a mark MDi comprising a visual representation of the hash code Ji, and to the use of this process in control and documentation of product or service quality, logistics, or manufacturing.

17 Claims, 4 Drawing Sheets

DEVICE TO DOCUMENT PROCESSES

CROSS-REFERENCE TO RELATED APPLICATIONS

This application is a national stage application (under 35 U.S.C. §371) of PCT/EP2012/054305, filed Mar. 12, 2012, which claims benefit of European application 11157617.9, filed Mar. 10, 2011.

FIELD OF THE INVENTION

The invention relates to a multi-component device to document processes comprising at least one step, to a method of use thereof, and to an application of this multi-component device and method of use thereof in quality control and tracking of manufacturing and logistic processes.

BACKGROUND OF THE INVENTION

Tracking of multi-step processes such as manufacturing and/or logistic processes including information on each manufacturing or transport or other service step is presently done by written or printed documents which leave room for exchange or change with only insufficient means to detect and avoid such tampering. It is therefore desired to provide a device to document any product or service which involves at least one step or stage between the supplier and the recipient of such products or services.

SUMMARY OF THE INVENTION

It has been found that marking of an object which is preferably a product itself, or a container which contains the said product, or of a document associated with a service, or constituting the service, with a mark that comprises an identification part which is unique every time it is produced, and optionally, a readable part which can be a printed text or a printed bar or dot code, can be used to unequivocally identify each object. The uniqueness of the identification part of the mark can be ascertained by the introduction of a random element in combination with a method to fix a random distribution to make it permanent.

In the case of printing, this combination of a random event and a method to permanently fix a random configuration is, according to the invention, made by a toner or an inkjet ink comprising a minor amount of particles that can be identified by any property differing from the properties of the major amount of particles. A "minor" amount in this context refers to a mass fraction of from 0.001% to less than 50%, practically between 0.01% and 1%. The property which differs for the particles representing the minor amount from the corresponding property of the particles representing the major amount can be a difference in colour, in luminescence, or in magnetic or radioactive properties which can be read by an appropriate device once the particles are fixed on a surface, e. g. by the process of printing, such as a minor amount of red pigment particles in a black toner, or a minor amount of luminescent pigment particles in a toner or an inkjet ink, or magnetic or radioactive particles in a toner or printing ink.

It is possible to mark the product itself, such as a ready-assembled motor vehicle, or a computer on its housing, a document such as an identification card or a passport, a money bill, or freight documents accompanying a shipment. Application of the mark may constitute a step in the multi-step process, preferably also the final step.

An object of this invention is therefore a multi-component device Z to document processes R comprising at least one step wherein, in a step i of the process, a product $D_i$ is made from one or more components $C_{ij}$, comprising for each of the process steps i a device Y collecting information $IC_{ijp}$ from all n components $C_{ij}$ of step i, with j being selected from integer numbers from 1 to n, used to make the product $D_i$ of an individual process step i, by reading from a mark or a label attached to any component $C_{ij}$ which may be a starting product or a material used in that process step, or a product from a previous process step, information $IC_{ijp}$ which identifies the said component $C_{ij}$, where i is an integer number which may assume values from 1 to m, m being equal to the number of steps in the process comprising at least one step, and where j is an integer number which may assume values from 1 to n, where n is equal to the number of components $C_{ij}$ used in the said process step i, and where p can be different for each of the steps i and is an integer number which may assume values from 1 to $q(ij)$, where $q(ij)$ is the number of individual informations relating to each component $C_{ij}$, which $q(ij)$ may be different for each different $C_{ij}$, the entirety of all informations $IC_{ijp}$ for component $C_{ij}$ also being referred to as $IC_{ij}$, a device X calculating in the process step i, a hash code $H_{ij}$ for each j from 1 to n, and for all p from 1 to $q(ij)$, from the said information $IC_{ijp}$ read from component $C_{ij}$, a device W calculating a hash code $J_i$ from all n hash codes $H_{ij}$ of all n components $C_{ij}$ used in process step i, and optionally, additionally from data read from a timer V which provides a system time of the equipment used in process step i, and/or from a device U providing information about the geographical location where process step i is conducted, and a device T providing the product $D_i$ of step i with a mark or a label $MD_i$ comprising a visual representation of the hash code $J_i$, characterised in that the said mark or label $MD_i$ is printed or otherwise applied to a surface of the product $D_i$ of step i by a process conducted in the device T comprising providing a major amount of particles Pa and a minor amount of at least one kind of particles $P_{zk}$, wherein the particles Pa and the particles $P_{zk}$ differ in at least one physical property which difference in physical properties between the particles Pa and the particles $P_{zk}$ is detected by a device S, mixing the said particles Pa and the said minor amount of at least one kind of particles $P_{zk}$ to provide a mixture Ml of particles, applying the mixture Ml to a substrate which is either the product $D_i$ made in process step i, or a container containing the product $D_i$, or a label attached to the product $D_i$, and fixing the distribution of the said mixture Ml of particles on the said substrate to provide a fixed mixture Mfi on the said substrate, which fixed mixture Mfi constitutes at least a part of the mark or label $MD_i$, where any of i, j, k, l, m, n, p and $q(ij)$ are, independently from each other, an integer number of at least 1.

The number k of particles $P_{zk}$ which are different from the particles Pa is at least one, and preferably, sufficient to detect these particles in a mixture with particles Pa when applied as a mark or a label, or otherwise, on a surface. The value of k may, of course, be different in each step.

"At least one step", as used herein, may be one step, or more than one step.

The product Di can be an object, or a service, or a document, where the document itself can be the product, or the document can be a description of the product or service.

A further object of the invention is a multi-step process or service which is conducted in at least one step wherein any step of the multi-step process or service can be described or otherwise represented by a document, wherein a hash code Ji is calculated in a device W from information used to create a document Di, or from the document Di created in, or constituting, the step i, optionally, calculating a further hash code J'i from Ji and data read from a timer which provides a system time of the equipment used in process step i, and/or from a device providing information about the geographical location where process step i is conducted or finalised, providing the document Di of step i with a mark or a label comprising a visual representation of the hash code Ji or J'i, where i is an integer number which may assume values from 1 to m, where m is equal to the number of steps in the multi-step process or service, wherein the label or mark is printed or otherwise applied to a surface of the document Di of step i by a process comprising providing a major amount of particles Pa and a minor amount of at least one kind of particles Pzk, wherein the particles Pa and the particles Pzk differ in at least one physical property mixing the said particles Pa and the said minor amount of at least one kind of particles Pzk to provide a mixture Ml of particles, applying the mixture Ml to a substrate which is either a document Di created in process step i, or a container containing the document Di, or a label attached to the product Di, and fixing the distribution of the said mixture M of particles on the said substrate to provide a fixed mixture Mfi on the said substrate, where any of i, k, and l are, independently from each other, an integer number of at least 1.

The mixtures Ml may be the same, or may be different for each step, and need a sufficient number of particles Pzk, as mentioned supra, to enable the detection of the distribution of the particles Pzk in the fixed mixture, such as in the developed toner image of a printed paper, or in the dried print made with an inkjet printer, or in the partially heated picture generated by a thermal paper printer.

A further object of this invention is a multi-component device Z which comprises a device S which detects the distribution of particles Pzi in the said fixed mixture Mfi to a hash code HMfi which is used to mark the product Di or document Di which may also describing or constituting the service Di, or the container containing the said document or product or object of service Di, or the label attached to Di, which means of conversion is used in creating the hash code Hi of step i.

A further object of the invention is a process wherein a mark embodied by a random-generated and fixed distribution of a minor amount of particles is read from the product or products or document or documents of the previous stage, and used together with information relating to the current step i to generate a hash code Hi which is used together with the hash code HMfi to calculate a hash code H"i used for marking the product or document of the instant step i.

A further object of the invention is a method of storing information about each step of the multistage process in a database where the hash code HMfi or the hash code H"i is used as the key field in the said database, with field entries describing the kind and amount of components Cij used in the present step i, such as raw materials, auxiliary materials, labour, and quality data collected for the components Cij, to make the product Di of the present step, or content and format of the documents on which the document of the present step Di is based.

A BRIEF DESCRIPTION OF THE FIGURES

FIG. 1 an overview of the wiring diagram in a simplified set-up using two-bit words rather than the actual realisation which uses 128 bit words or 256 bit words, FIG. 2 a detail of FIG. 1 which is the Write Port where data are written to the memory, FIG. 3 a detail of FIG. 1 which is the Match Circuit where the signal from the Data Find bus and the Write Data bus are compared, and Access to Memory at the address calculated in the Find Port as detailed in FIG. 4 is granted upon match of these, FIG. 4 a detail of FIG. 1 which is the Find Port which converts the hash read to an address in the data base, and FIG. 5 a synopses of all component devices of multi-component device z.

DETAILED DESCRIPTION OF THE PREFERRED EMBODIMENTS

In a preferred embodiment, wherein the process R has at least two steps, and wherein at least one of the components Ci+1,j used in step i+1 is a product Di of the preceding step i, the multi-component device Z is used in each of the at least two process steps.

In this device Z, the hash code Ji is read by the device S which constitutes a part of the multi-component device Z, from the mark MDi embodied by fixed distribution of the minor amount of at least one kind of particles Pzk is read from the mark or label MDi of the product Di of the stage i, and used together with information relating to the current step i+1 to generate a hash code Hi+1 in device X which is used together with the hash code HMfi to calculate in device W a hash code H"i used for marking the product of the instant step i. This device S may be a scanning spectrometer which detects the reflected light, or fluorescent light, with spectral and location resolution, under irradiation of the label or mark MDi with visible light or UV light, or infrared light, in an embodiment where the particles Pzk differ from the particles Pa by their colour, or by their reflectance, or by their ability to emit fluorescent light when irradiated with UV or short wavelength visible light. It is, of course, also possible to detect radioactive particles, or magnetic particles, or particles of electrically dipolar nature, or particles having different electric or magnetic susceptibility, in a device S that is able to measure these properties in sufficient spatial resolution.

In a preferred embodiment, the multi-component device Z is equipped with an interface for data processing and storage equipment, wherein information about each step of the process is stored in a database where the hash code HMfi or the hash code H"i is used as the key field in the said database, with field entries describing the kind and amount of components Cij used in the present step i, such as raw materials, auxiliary materials, labour, and quality data collected for the components Cij, to make the product Di of the present step, or content and format of the documents on which the document of the present step Di is based.

In this context, also information about the duration of any process step, as well as further ambient conditions such as temperature, pressure, humidity, and their change in time, or machines or devices used in that process step, are regarded as components $C_{ij}$ of that step, and as such are comprised in the full information relating to that process step.

The mark is preferably affixed to a product or a document embodying a service in a way that it cannot be detached therefrom, or can only be detached in a mutilated form. A preferred mark comprises two parts that may be spatially separated, where one mark $M2D_i$ comprises information about the other mark $M1D_i$, particularly preferred, information collected by reading with device S, about the distribution of particles $P_{zi}$ in the said fixed mixture $Mf_i$ of step i present in the mark $M1D_i$ which has been converted to a hash code $HMf_i$ which hash code is then used to generate and apply by device T, the mark $M2D_i$ to the product $D_i$. Both marks are then read by a detector which responds to the fixed distribution of particles $P_{zi}$ in both marks M1 and M2, and the hash code generated from this combined information is used in the database as the key field to record all pertinent data for this step i.

In a further preferred embodiment, an RFID tag is used to mark the product or document $D_i$ of step i, wherein the RFID tag contains a hash code $H_i$ which is also printed by device T on the first label of this RFID tag with a toner or an inkjet ink or on a thermal paper containing particles Pa and particles $P_{zi}$. In this case, it is further preferred that the first label or mark $M1D_i$ is read by reading device S, and a hash code $HMf_i$ is calculated in device X from the read data, merged or concatenated with the first hash code $H_i$ to form a hash code $J_i$ which is then printed by device T as second label or mark $M2D_i$ on the RFID tag. These RFID tags can be individualised, in a preferred embodiment, before printing by collecting a plurality of RFID tags in a container of a read-write unit which reads the identification codes of all RFID tags in the container in a bulk read, and generates an internal table of these, and assigns a calculated hash code to each of the RFID tags in the container. Each of the RFID tags will then be provided, in a preferred embodiment, with a label printed in the write unit device T bearing the RFID tag identification code, and the hash code assigned. The label on the RFID tag has preferably two parts, wherein the second part $M2D_i$ of the label is generated from reading the first part $M1D_i$ of the label and the fixed positions of the particles $P_{zk}$ of the first part $M1D_i$ of the label, as described supra. The hash code $H''_i$ generated in device X for $M2D_i$ is further preferably a concatenated hash code $HMf_i$ calculated from the first hash code $H_i$ and the fixed positions of the particles $P_{zk}$.

One preferred method of marking a product or a document embodying or relating to, a service, of a selected step i is by use of an RFID tag that contains a hash code $H_i$ which is also printed on the first label of this RFID tag with a toner or an inkjet ink or on a thermal paper containing particles Pa and particles $P_{zi}$. The first label or mark $M1D_i$ is then read by an appropriate reading device S, and a hash code $HMf_i$ is calculated from the read data, merged or concatenated with the first hash code $H_i$ to form a hash code $J_i$ which is then printed by device T, as second label or mark $M2D_i$ on the RFID tag. This constitutes a self-verifying RFID tag, as any duplication of the first label or the content of the RFID itself will mandatorily lead to a different second label $M2D_i$. As this RFID tag also comprises information about the previous step by virtue of containing information about the components $C_{i-1,j}$, from the hash code $H_{i-1}$ which is generated from the hash codes of all elements of the previous stage, this verifies the history of each product or document of this stage. This history can be, in the case of a product, a list of kinds and amounts of all materials used to make the product of this step, including manufacturing data such as pressure, temperature, humidity, time, date, and location, if a GPS signal is added to the manufacturing data. In the case of a document being forwarded over several stages with different locations, such as collecting from the sender, a collecting centre, a distribution centre or hub, various airports, a delivery centre, and finally, of the recipient, information about time and location for each of these stages can be recorded by building in each case, a new hash code from the hash code of the prior stage and the distribution of particles in the label of the present stage.

A document representing a service can preferably be the papers accompanying goods to be delivered. A document embodying or constituting a service is preferably a draft for a contract between two or more parties, or a cheque or a bill of exchange.

The hash codes for each step can be recorded in a database, where the hash codes themselves constitute the key field of the record in the database, and further specific information like time and location, or starting material data and date and location of a manufacturing stage which is preferably also recorded in this record. It is not needed to request a key field number, as by the use of a hash code of appropriate length, it is ensured that each hash code, or key field, is unique which is mandatory in such database. Therefore, the transitions between steps where a verification is made, does not need a fast internet connection. Update of the database can therefore be made offline.

The uniqueness of the hash code, and thereby, the key field in the database, is ensured by using the algorithm as described in DE 10 2007 045 692. This method of generating the hash code makes sure that all prior stages, i. e. the stages before the stage under consideration, with their characteristic data are comprised in the hash code calculated in a stepwise fashion from these. Exchange of at least one prior step, or of any element used in such prior step, yields a different hash code and therefore easily be detected.

According to a preferred embodiment of the invention, calculation of the hash codes is made by simple boolean logic, which has the advantage of being fast and using only little calculating power.

This calculation of hash codes and storage thereof is made in a control system referred to as database indexing circuit which comprises
  a writing unit W which has a plurality of data write ports WD and a memory address select port WM, which writing unit writes to a storage medium,
  a random read unit R which has a plurality of data read ports RD, which reading unit reads information in a random or ordered sequence from a storage medium,
  a set of access registers $A_i$, each of which having write control ports $A_iWC$ which feed data to the data write port WD, read control ports $A_iRC$ which receive data from the read port RD, the read and write control ports being connected by a set of buses to a logic unit which links the data received from the read port RD and/or the data to be written to the write port WD with the address which is calculated in the logic unit from the data read and/or the data to be written, based on a hash code calculated from the said data in a hash calculation unit, preferably a hardware-based calculation unit, and stores the data on the calculated address and/or reads the data from the calculated address.

A mobile device for generation and storage of hash codes having the structure of a distributed database is explained here:

In a mobile write and read device, the extended database structure is based on the potential of RFID tags operated at ultra-high frequency (UHF RFID tags) to allow bulk reading. The bulk writing option is not broadly used, as single write operation is far more frequently encountered. The term "bulk rw" when used here only addresses the option to select an individual device in a lot in order to trigger predefined actions in this device. Other than so-called hard-wired circuits, or logical circuits, addressing RFIDs is possible from undefined locations and directions, and not limited to conducting strips on a board. The database concept used here needs multiple addressing, and needs to set entire bus systems in one of three states in order to couple a further bus to the same chip. The "on air" addressing system used in RFIDs avoids this effort which is particularly advantageous when flexibility is more important than speed. Anti-tap security can be provided by simple shielding.

A mobile device does not have to be geared for high speed because the total speed in relation to the amount of data collected results from the high number of individual mobile devices. Therefore, the large number of mobile devices and their addressing via radio frequency allows the handling of large data volumes by the parallel use of these mobile devices. A system for their use comprises devices to read and write RFID tags in a large number which are collected in a container. The present-day size of RFID tags which for instance may be spherical shaped and have a diameter of about 2 mm, allows to read and write many tags, about one thousand, with a single read-write unit (RWU) in the same, preferably shielded, container as they can be addressed individually. The unit to compute a hash code which is then written may be a separate one connected to the RWU, or may preferably be integrated into the RWU and has a pistol handle or similar form container wherein the lot of RFID tags is stored. The RWU unit reads the identification codes of all RFID tags in the container in a so-called bulk read, and generates an internal table of these. All products or documents to be marked will then receive an RFID tag containing the assigned calculated hash code, and at the same time a label is printed having the same information, i. e. the RFID tag identification code, and the hash code assigned. In the preferred way, the label has two parts, wherein the second part of the label is generated from reading the first part of the label and the fixed positions of the particles Pzk of the first part of the label. In this case, the hash code generated would be a concatenated hash code calculated from the first hash code and the fixed positions of the particles Pzk. The write process for RFID tags and labels will be repeated for all RFID tags present in the same container. The marked products or documents can then be shipped to their respective recipients, or to a hub from where transport and distribution are made. In a similar way, in any hub or at the recipient, the identity of products or documents received can be checked and verified by bulk reading and verifying of all RFID tags and labels for each received lot. This process does not need the access to the central database as verification can simply be made by checking the identity of RFID tag and label, and both parts of the two-part label. In a process consisting of many steps, the presence, and characteristic data of each step such as time and location, can therefore easily be verified. Upload to an external central data base is easily made by bulk writing outside of normal operating hours.

Figure 1:
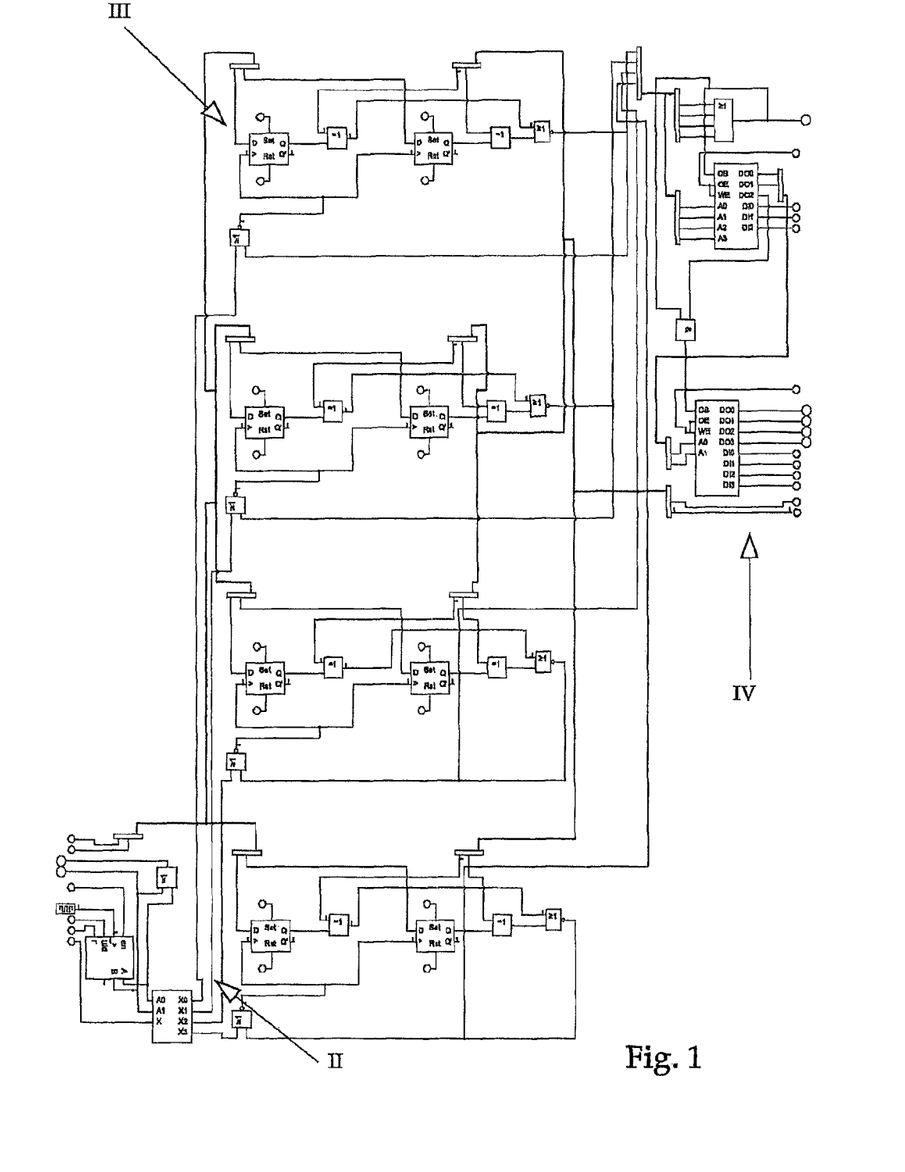
Figure 2:
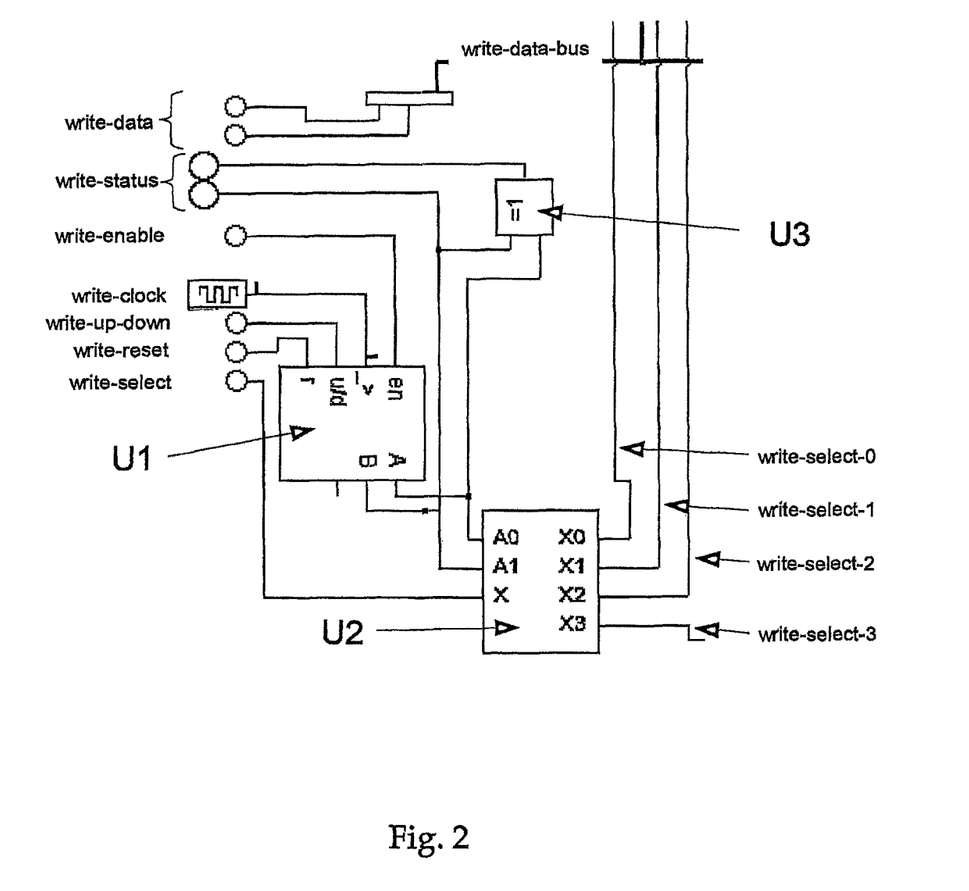
Figure 3:
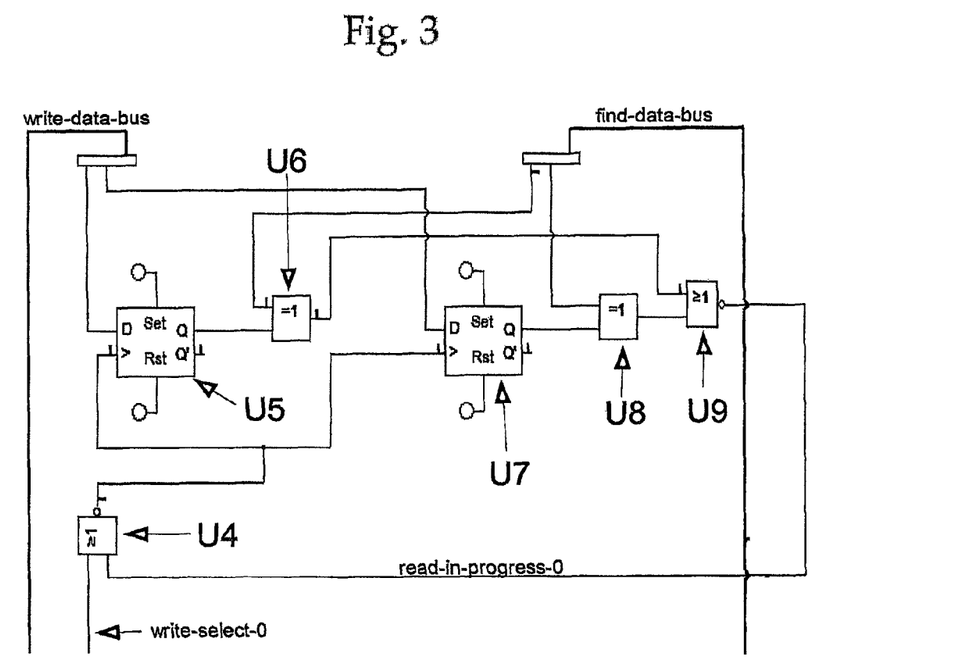
Figure 4:
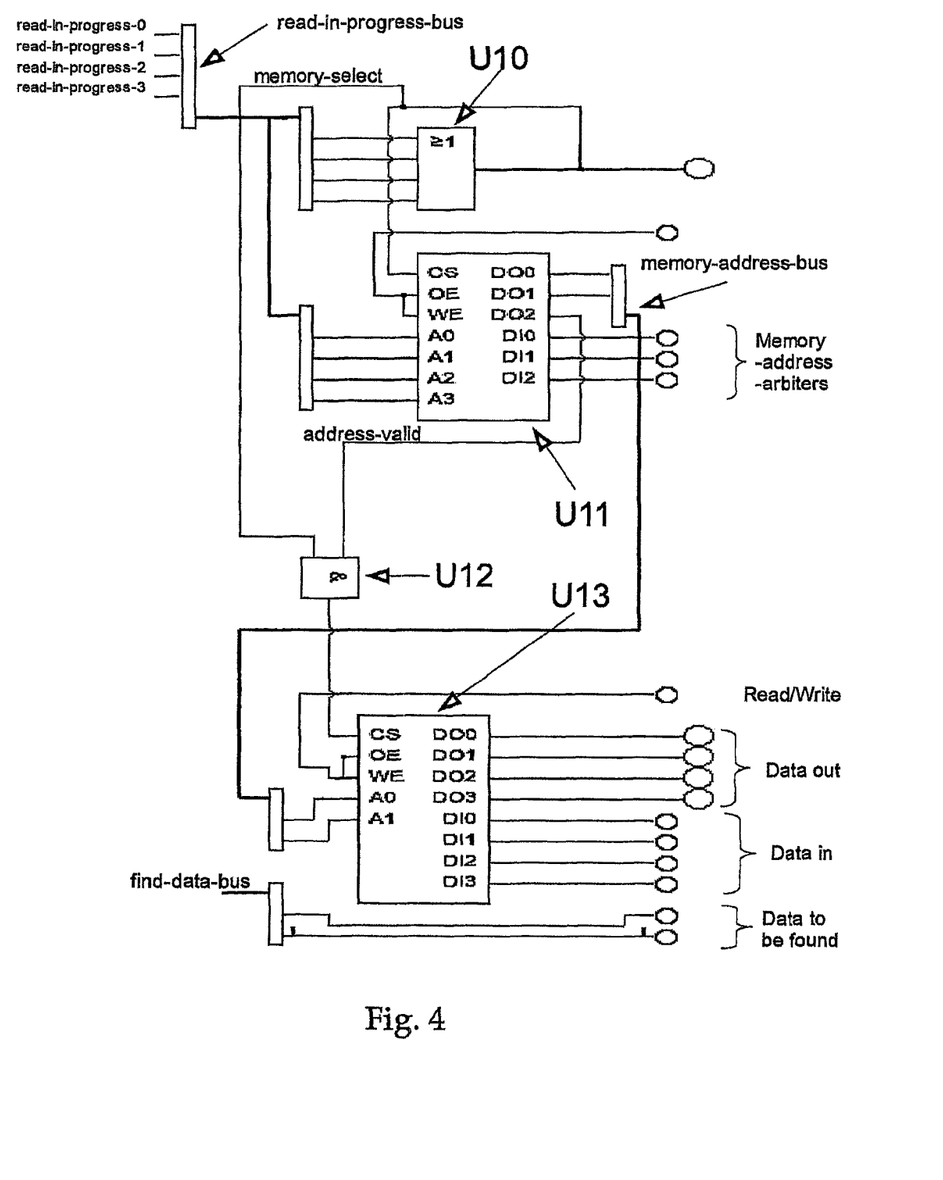
Figure 5:
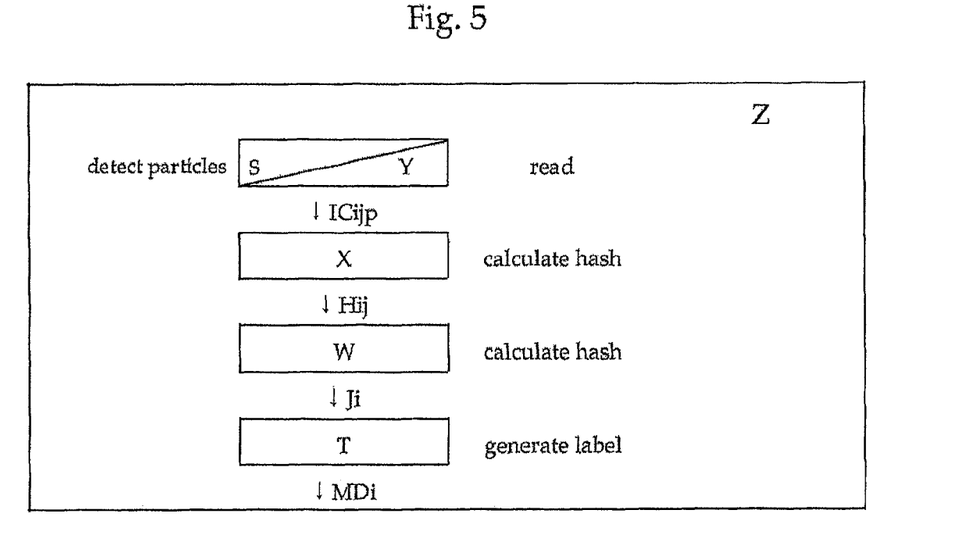

The control system for indexing a database is explained in the attached figures which show in FIG. 1 an overview of the wiring diagram in a simplified set-up using two-bit words rather than the actual realisation which uses 128 bit words or 256 bit words, FIG. 2 a detail of FIG. 1 which is the Write Port where data are written to the memory, FIG. 3 a detail of FIG. 1 which is the Match Circuit where the signal from the Data Find bus and the Write Data bus are compared, and Access to Memory at the address calculated in the Find Port as detailed in FIG. 4 is granted upon match of these, FIG. 4 a detail of FIG. 1 which is the Find Port which converts the hash read to an address in the data base, and FIG. 5 a synopsis of all component devices of multi-component device Z.

The control system for indexing a database used to store the data collected in the process according to the invention is set up as explained in FIG. 1, which contains the overview, and its 3 sub sheets FIG. 2—Write Port, FIG. 3—Match Circuit and FIG. 4—Find Port, in a simplified set-up using two-bit words, rather than the commercial realisation using 128 bit words or 256 bit words.

Initialising is done here by resetting the Write Port of FIG. 1 with details shown in FIG. 2 with the write-reset line at U1. The following designations for elements are used in FIG. 2:

U1 is a binary address counter,

U2 is a multiplexer that controls the Write-Select lines 0 to 3 depending on the Write-Select signal X, the Write-Clock, and the Write-Enable state, and U3 is an XOR gate setting the Write-Status.

The write select lines 0 to 3 select individual Match Circuits 0 to 3, where only one of these is shown on FIG. 1 for the sake of simplicity.

The individual lines and their meanings are:

Write-Data: 2-bit data input to database are 4 possible combinations needing 4×2=8 bits memory total Write-Status: 2-bit data output indicating status of database Write-Enable: enable line U1

Write-Clock: square pulse clock

Write-Up-Down: change writing direction

Write-Reset: clears counter

Write-Select: acting as enable for U2

A write cycle to the Write Port 1 feeds the key field data, equivalent to the hash code, from a physical memory together with the appropriate signals shown in FIG. 2.

The logic units U1, U2 and U3 are combined in a way that only one of the bi-state or flip-flop memories is selected as long as the write cycle is active.

FIG. 3 shows a wiring diagram and logics of the match circuit which consists of a number of flip-flop memory cells which are interconnected via the logic units U4 to U9 in a way that via U6, U8, and U9, an unequivocal signal is generated at the output of U9 as a comparison bit for the detected presence of a value from the Find-Data bus. As all output lines of the memory cells (flip-flops) to be checked are connected to a corresponding input line of the XOR gates U6 and U8, and the second input lines of the said XOR gates U6 and U8 are all connected, the presence of the data looked for is reflected in the output lines of the said XOR gates. This is why this circuit is referred to as "Match Circuit".

FIG. 4 shows the wiring and logics of the find circuit. The "Read-in-Progress" signals are converted via U10 and U11 to an address if the Find Circuit of FIG. 3 returns a positive response. Should the Find Circuit of FIG. 3 not return a positive response, or if a positive response leads to the same address being calculated via U10 and U11, error handling is activated, and the error bit is fed to U12 resulting in a not/enabled state in CS of U13. In the case of a positive response, the hash code representing the address is provided at the output lines of U13. In this set-up, the Read-in-Progress lines are acting as an arbiter controlling memory access.

The logic parts used are:

U4=nor gate

U5=data flipflop

U6=xor gate

U7=data flip flop
U8=xor gate
U9=nor gate

Data on write-data-bus and find-data-bus are compared during the Find operation. If there is no positive response (no match), no additional ram is selected (error state). If the response is positive (match), additional ram is selected and additional data can be stored and/or read. This is done always with respect to the contents of the hash database. So the hash is both the data to be stored but also the indirect index how to find it again and how to concatenate additional data to the corresponding hashes.

While it may suffice to use the hash codes as key fields, which hash codes are generated within the multi-component device Z for self-verification, a remotely accessible database must also comprise information about the location of that database that allows remote addressing. This is easily implemented into the documentation provided by the multi-component device Z, by adding the IPv4-address ($2^{32}$=4 294 967 296 possible address values) or the soon-to-be-implemented IPv6-address ($2^{128}$=approximately $3.4 \times 10^{38}$ possible address values) to the information of the hash codes, and generating therefrom a new hash code used as key field.

The invention is further explained by the examples which follow.

EXAMPLES

Example 1

Multi-Step Production Process

A chemical product was made by a three-step process, where in the first step, the reaction was made by mixing three reactants A1, A2 and A3 at a temperature AT, and reacting for a specified time span AS. The masses of the reactants were mA1, mA2 and mA3. The recipe was recorded in a first entry into the RFID tag by calculating a hash code from the CAS numbers of the three reactants (Chemical Abstracts Service numbers), their masses, and the reaction temperature(s) and time(s), (all these data or values used as "components Cij") and stored in the RFID tag fixed to the container or the reaction product B1, using the value of the hash code as key field.

The product of the first step referred to as B1 was then reacted in the second step with a further chemical B2 at a temperature BT for a time span BS. The masses of the reactants were mB1 and mB2. The recipe was recorded in a second entry by calculating a hash code from the CAS numbers of the three reactants (Chemical Abstracts Service numbers), their masses, and the reaction temperature(s) and time(s), again all these values used as components Cij, and stored in the RFID tag fixed to the container or the reaction product, using the value of the hash code as key field. Yield and purity of the resulting reaction product referred to as C1 were determined and also recorded, together with the recipe of the second step, in an RFID tag affixed to the container for the reaction product C1.

The reaction product C1 of the second step was there transferred to the reaction of the third step, using the auxiliary materials C2, C3, and C4. As in the preceding steps, masses of the reactants, their CAS number for identification, and the reaction conditions (temperatures, time spans) were recorded, used to calculate hash code which was then written to an RFID tag affixed to the product of the third reaction step which was then prepared for shipment to the customer.

By using the hash code of the prior step as an additional component to calculate the hash code for the reaction product of any stage, it is possible to unequivocally control and document all steps performed which was the basis for the quality control system in this example. All analytical data measured on starting products, intermediates, and final products were also used in calculating the hash codes, as well as date and time of each manufacturing step.

Additionally, as similar system as described in Example 2 was used to print the hash codes for each step on the RFID tags. Entry into the quality control data base of the manufacturer could also be made off-line once per day as the size of the hash code allowed creation of unique key field values in each case.

Example 2

Multi-Step Logistic Process

An object O was collected in a place A, where a receipt was issued to the sender, the object was then transported to a hub B, combined in hub B with other objects to the same destination D in a box, transported to a second hub C where the contents of the box were taken out and the object O was then transported to its destination D, and handed over to the recipient R against a receipt. The object was identified with an RFID tag which contained information about the sender, the recipient, and the carriers.

At the collection point A, an RFID tag was written with a hand-held electronic device, which had a means of recording the signature of the sender, and affixed to the object O. A label for the RFID tag was printed by the hand-held device that contained a hash code calculated from the name and address of the sender, the date and time of collection, and the location of collection which was generated within the hand-held device by a GPS sensor element, a timer system, and the pressure-sensitive signature filed in the hand-held device. The first part of the label was printed with a heat-sensitive paper and printing head where the heat-sensitive paper contained randomly dispersed fluorescent pigments. The printed zone on the label was then scanned with a blue light-emitting diode, and the position of the fluorescent pigment particles was recorded by the scanning head incorporated into the handheld device, and converted to a series of x and y coordinates which was used together with the first hash code to calculate a second hash code which was then printed as the second part of the label. The hash codes are also stored in the RFID tag.

Further labels are printed in each location where the object is unloaded, and packed to a new vehicle for transport. This series of labels is therefore unique.

At each of the locations A, B, C, and D, the previous labels were scanned, and the contents are compared to the content of the RFID tag, so that the identity of the object can be verified. The label at location B was generated using the hash code read from the label printed in location A, and complemented by date, time and location recorded by the hand-held device used to scan the label. This procedure was used in all the other locations as well, leading to printed labels for locations a, B, C, and D which allow a full reconstruction of the locations and the times of arrival or departure in these locations. Non-encoded information was stored for times, locations, and names of sender and recipient to allow tracing of the object. This information was stored in the RFID in a database format, with the value of the hash codes as key field. As this hash code, using an adequate length of at least 128 bit, had about $3.4 \times 10^{38}$ possible different values, there is negligible probability of generating the same value for the key field twice. This generation of key fields made it possible to generate the database entries without being connected, and having to wait for an assigned value for a key filed. This allowed to enter the database records only once very day to the central database of the logistics company.

As this second hash code is based on the information used for the first hash code and the random code generated by the random position of the fluorescent particles in the first part of the label, the second part of the label is unique, and it is particularly not possible to copy because a copy would generate a different second hash code, and therefore, a different second part of the label. The authenticity can be controlled at any location by reading the first and the second hash code, and calculating the second hash code from the first hash code and the position of the fluorescent pigment particles in the first part of the label. Only the original label will lead to the same result.

The invention claimed is:

1. A multi-component device Z to document processes R comprising at least two steps wherein, in a step i of the process, a product $D_i$ is made from one or more components $C_{ij}$, this multi-component device Z comprising the following devices used for each of the process steps i an information-collecting device Y collecting information $IC_{ijp}$, from all n components $C_{ij}$ of step i, used to make the product $D_i$ of an individual process step i, by reading from a mark or a label attached to any component $C_{ij}$ which may be a starting product or a material used in that process step, or a product from a previous process step, information $IC_{ijp}$ which identifies the said component $C_{ij}$, where i is an integer number which may assume values from 1 to m, m being equal to the number of steps in the process comprising at least one step, and where j is an integer number which may assume values from 1 to n, where n is equal to the number of components $C_{ij}$ used in the said process step i, and where p can be different for each of the steps i and is an integer number which may assume values from 1 to $q(ij)$, where $q(ij)$ is the number of individual informations relating to each component $C_{ij}$, which $q(ij)$ may be different for each different $C_{ij}$, the entirety of all informations $IC_{ijp}$ for component $C_{ij}$ also being referred to as $IC_{ij}$, a hash-calculating device X calculating in the process step i, a hash code $H_{ij}$ for each j from 1 to n, and for all p from 1 to $q(ij)$, from the said information $IC_{ijp}$ read from component $C_{ij}$, a hash-calculating device W calculating a hash code $J_i$ from all n hash codes $H_{ij}$ of all n components $C_{ij}$ used in process step i, and optionally, additionally from data read from a timer V which provides a system time of the equipment used in process step i, and/or from a device U providing information about the geographical location where process step i is conducted, and a marking or labelling device T providing the product $D_i$ of step i with a mark or a label $MD_i$ comprising a visual representation of the hash code $J_i$, characterised in that the said marking or labelling device T applies a mark or label $MD_i$, by printing or otherwise applying a mark or label $MD_i$ to a surface of the product $D_i$ of step i by a process conducted in the device T comprising providing a major amount of particles Pa and a minor amount of at least one kind of particles Pzk, wherein the particles Pa and the particles Pzk differ in at least one physical property which difference in physical properties between the particles Pa and the particles Pzk is detected by a detector device S, mixing the said particles Pa and the said minor amount of at least one kind of particles Pzk to provide a mixture Ml of particles, applying the mixture Ml to a substrate which is either the product $D_i$ made in process step i, or a container containing the product $D_i$, or a label attached to the product $D_i$, and fixing the distribution of the said mixture Ml of particles on the said substrate to provide a fixed mixture $M_{fi}$ on the said substrate, which fixed mixture $M_{fi}$ constitutes at least a part of the mark or label $MD_i$, where any of j, k, l, m, n, p and $q(ij)$ are, independently from each other, an integer number of at least 1, and i is an integer number of at least 2, characterised in that the mark $MD_i$ comprises two parts that are spatially separated, where one mark $M2D_i$ comprises information about the other mark $M1D_i$, which information comprises information about the distribution of particles $P_{zi}$ in the said fixed mixture $M_{fi}$ of step i present in the mark $M1D_i$ which is converted to a hash code $HM_{fi}$ which hash code is then used to generate in device T, and apply by device T, the mark $M2D_i$ to the product $D_i$.

2. The device Z of claim 1 wherein at least one of the components $C_{i+1,j}$ used in step i+1 is a product $D_i$ of the preceding step i.

3. The device Z of claim 1, wherein the hash code $J_i$ is read by the device Y from the mark or label $MD_i$ of the product $D_i$ of the stage i, and used together with information relating to the current step i+1 to generate a hash code $H_{i+1}$ in device X which is used together with the hash code $HM_{fi}$ which is calculated from the information read from mark $M1D_i$ to calculate in device W a hash code $H''_{i+1}$ used for marking the product of the instant step i+1.

4. The device Z of claim 3, wherein information about each step of the multistage process is stored in a database where the hash code $HM_{fi}$ or the hash code $H''_i$ is used as the key field in the said database, with field entries describing the kind and amount of components $C_{ij}$ used in step i, to make the product $D_i$, or content and format of the documents on which the document $D_i$ is based.

5. The device Z of claim 4 wherein said field entries describing the kind and amount of components $C_{ij}$ used in step i are raw materials, auxiliary materials, labour, and quality data collected for the components $C_{ij}$.

6. The device Z of claim 1 wherein the mark $MD_i$ is affixed by device T to the product $D_i$ in a way that it cannot be detached therefrom, or can only be detached in a mutilated form.

7. The device Z of claim 6 wherein an RFID tag is used as mark $MD_i$ to mark the product of step i, characterised in that the RFID tag contains a hash code $H_i$ which is also printed by device T on the first label or mark $M1D_i$ of this RFID tag with a toner or an inkjet ink or on a thermal paper, any one of these containing particles Pa and particles $P_{zi}$.

8. The device Z of claim 7 wherein the first label or mark $M1D_i$ is read by reading device Y, and a hash code $HM_{fi}$ is calculated in device X from the read data, merged or concatenated with the first hash code $H_i$ to form a hash code $J_i$ which is then printed by device T as second label or mark $M2D_i$ on the RFID tag.

9. The device Z of claim 7 wherein a plurality of RFID tags are collected in a container of a read-write unit which reads the identification codes of all RFID tags in the container in a bulk read, and generates an internal table of these, and assigns a calculated hash code to each of the RFID tags in the container.

10. The device Z of claim 9 wherein a label is printed in the write unit device T having the RFID tag identification code, and the hash code assigned.

11. The device Z of claim 10 wherein the label has two parts, wherein the second part M2Di of the label is generated from reading the first part M1Di of the label and the fixed positions of the particles Pzk of the first part M1Di of the label.

12. The device Z of claim 11 wherein the hash code H"i generated in device X for M2Di is a concatenated hash code HMfi calculated from the first hash code Hi and the fixed positions of the particles Pzk.

13. A method of use of the multi-component device Z of claim 1 comprising documenting each step in a multi-step process by applying the following process in each single process step:
  collecting, in a device Y, information ICij from all components Cij used to make the product Di of an individual process step i, by reading from a mark or a label attached to any component Cij which may be a starting product or a material used in that process step, information ICij which identifies the said component Cij, where i is an integer number which may assume values from 1 to m, m being equal to the number of steps in the process, and where j is an integer number which may assume values from 1 to n, where n is equal to the number of components Cij used in the said process step i,
  calculating, in a device X, in the process step i, a hash code Hij for each j from 1 to n, from the said information read from component Cij,
  calculating, in a device W, a hash code Ji from all n hash codes Hij of all n components used in process step i, and optionally, additionally from data read from a timer V which provides a system time of the equipment used in process step i, and/or from a device U providing information about the geographical location where process step i is conducted, and
  providing, in a device T, the product Di of step i with a mark or a label MDi comprising a visual representation of the hash code Ji,
wherein said mark or label MDi is printed or otherwise applied to a surface of the product Di of step i by a process conducted in the device T comprising
  providing a major amount of particles Pa and a minor amount of at least one kind of particles Pzk, wherein the particles Pa and the particles Pzk differ in at least one physical property which difference in physical properties between the particles Pa and the particles Pzk is detected by a detecting device S,
  mixing the said particles Pa and the said minor amount of at least one kind of particles Pzk to provide a mixture Ml of particles,
  applying the mixture Ml to a substrate which is either the product Di made in process step i, or a container containing the product Di, or a label attached to the product Di, and
  fixing the distribution of the said mixture Ml of particles on the said substrate to provide a fixed mixture Mfi on the said substrate, which fixed mixture Mfi constitutes at least a part of the mark or label MDi,
where any of j, k, l, m, and n, are, independently from each other, an integer number of at least 1, and i is an integer number of at least 2.

14. The method of use of claim 13 wherein the product Di is a document.

15. The method of use of claim 13 wherein a database is provided comprising storing all information relative to all components Cij, for all j=1 to j=n of each single step i, and relative to all Di of all steps from i=1 to i=m, in the form of their hash codes Hij and Ji, wherein the hash code H"i or the hash code HMfi, together with i, is used a key field KF(Di) for all information relating to Di, and wherein the hash code H"i or the hash code HMfi, together with i and j and p, is used a key field KF(Cijp) for all p informations relating to Cij.

16. The method of use of claim 15 wherein the key field KF(Di) is calculated as hash code from hash code H"i or the hash code HMfi, together with i, and the key field KF(Cijp) is calculated as hash code from the hash code H"i or the hash code HMfi, together with i and j and p.

17. The method of use of claim 15 wherein the key field KF(Di) is calculated as hash code from the IP address of a database server hosting the database, the hash code H"i or the hash code HMfi, together with i, and the key field KF(Cijp) is calculated as hash code from the IP address of a database server hosting the database, the hash code H"i or the hash code HMfi, together with i and j and p.

* * * * *